United States Patent [19]
Shyu

[11] Patent Number: 5,814,198
[45] Date of Patent: Sep. 29, 1998

[54] ELECTROLYTIC MAGNETIZATION DEVICE

[76] Inventor: Wen-Shing Shyu, 58, Ma Yuan West St., Taichung, Taiwan

[21] Appl. No.: 896,263

[22] Filed: May 11, 1997

[51] Int. Cl.$^6$ ............................... C02F 1/46; C25B 9/00; C25B 11/02
[52] U.S. Cl. ........................................... 204/260; 204/263
[58] Field of Search ................................... 204/260, 229, 204/263

[56] References Cited

U.S. PATENT DOCUMENTS

| | | | |
|---|---|---|---|
| 4,169,035 | 9/1979 | Stummer et al. | 204/260 |
| 4,654,137 | 3/1987 | Vaughan | 204/260 |
| 4,810,344 | 3/1989 | Okasaki | 204/229 X |
| 5,378,339 | 1/1995 | Aoki et al. | 204/260 X |

Primary Examiner—Donald R. Valentine

[57] ABSTRACT

An electrolytic magnetization device has an outer pipe, an anode tube, a diaphragm, a cathode tube, an insulating tube, and a water flow controller. A cover and a base seat cover an upper end of the outer pipe and a lower end of the outer pipe respectively. The cover has a water outlet. The base seat has a through hole and a water inlet. The anode tube is disposed in the outer pipe. The diaphragm is disposed in the anode tube. A hollow pipe is disposed in the diaphragm. The insulating tube is disposed in the hollow pipe. The water flow controller has an inlet joint connected to the water inlet, a main body disposed beneath the inlet joint, a flow control post having a water passage, a water pressure stabilizer, an automatic switch device, a water drain device, a first outlet joint, and a second outlet joint. The automatic switch device has a switch seat. A micromotion switch is disposed on the switch seat.

1 Claim, 6 Drawing Sheets

ELECTROLYTIC MAGNETIZATION DEVICE

BACKGROUND OF THE INVENTION

The present invention relates to an electrolytic magnetization device for magnetizing water. More particularly, the present invention relates to an electrolytic magnetization device which has a diaphragm to be washed or replaced easily.

It is difficult to replace a diaphragm of a conventional electrolytic magnetization device while the diaphragm is broken. It is also difficult to wash the diaphragm of a conventional electrolytic magnetization device while the diaphragm is dirty.

SUMMARY OF THE INVENTION

An object of the present invention is to provide an electrolytic magnetization device which has a diaphragm to be washed or replaced easily.

Another object of the present invention is to provide an electrolytic magnetization device which has a water flow controller in order to control a water pressure.

Accordingly, an electrolytic magnetization device comprises an outer pipe, an anode tube, a diaphragm, a cathode tube, an insulating tube, and a water flow controller. A cover and a base seat cover an upper end and a lower end of the outer pipe respectively. The cover has a water outlet. The base seat has a through hole and a water inlet. The anode tube is disposed in the outer pipe. The diaphragm is disposed in the anode tube. A hollow pipe is disposed in the diaphragm. The insulating tube is disposed in the hollow pipe 31. The outer pipe has a plurality of threaded holes to receive a plurality of corresponding screws respectively to fasten the cover and the outer pipe together. The water flow controller has an inlet joint connected to the water inlet, a main body disposed beneath the inlet joint, a flow control post having a water passage disposed in the inlet joint, a water pressure stabilizer connected to the main body, an automatic switch device connected to the main body, a water drain device connected to the main body, a first outlet joint connected to the water drain device, and a second outlet joint connected to the main body. The water drain device has a water outlet, a hollow interior to receive a ball and a plurality of O-rings disposed on the water drain device. The automatic switch device has a switch seat. A washer, a metal disk and a cushion are disposed in the switch seat. A micromotion switch is disposed on the switch seat. The micromotion switch contacts the metal disk slightly. An O-ring encloses the anode tube. An end disk and a distal groove are disposed on one end of the hollow pipe. An opening and a distal recess are formed on another end of the hollow pipe. A first string is inserted in the distal groove. A second string is inserted in the distal recess. The hollow pipe has a plurality of ribs. The insulating tube has a plurality of rabbets, axle holes, positioning holes and recesses. An axle is inserted through the corresponding axle holes. Each of the recesses receives a yoke shaped metal plate. Each yoke shaped metal plate receives two magnets. The axle has a center hole. A plug which has a first hole is disposed at one end of the axle. An end cover is disposed at another end of the axle. The end cover has a hollow post, a second hole, a plurality of cage recesses, and a groove. A plurality of O-rings enclose the plug. The hollow post is inserted in the through hole.

DETAILED DESCRIPTION OF THE INVENTION

Figure 1:
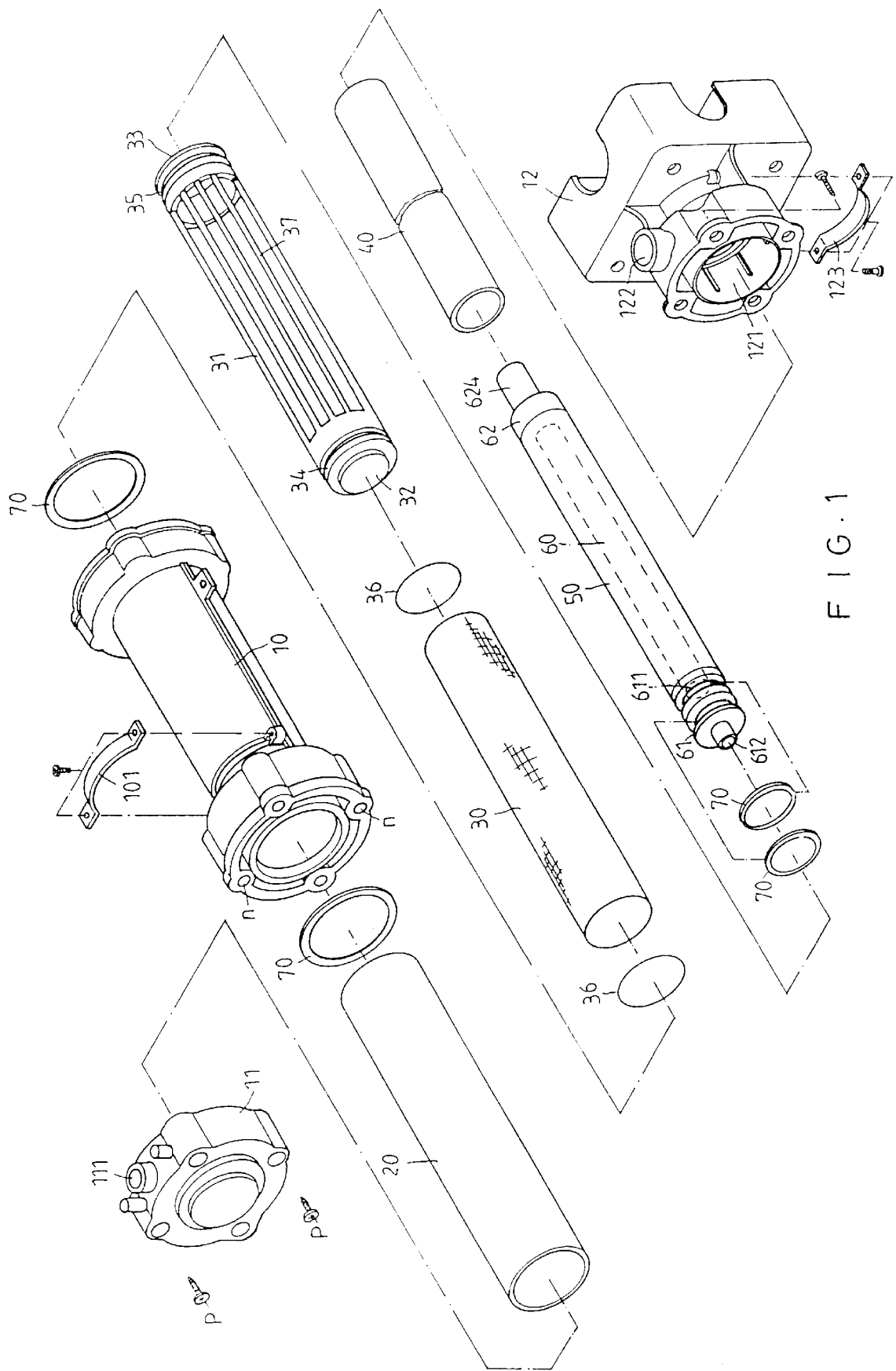
FIG. 1 is a partially perspective exploded view of an electrolytic magnetization device.
Figure 2:
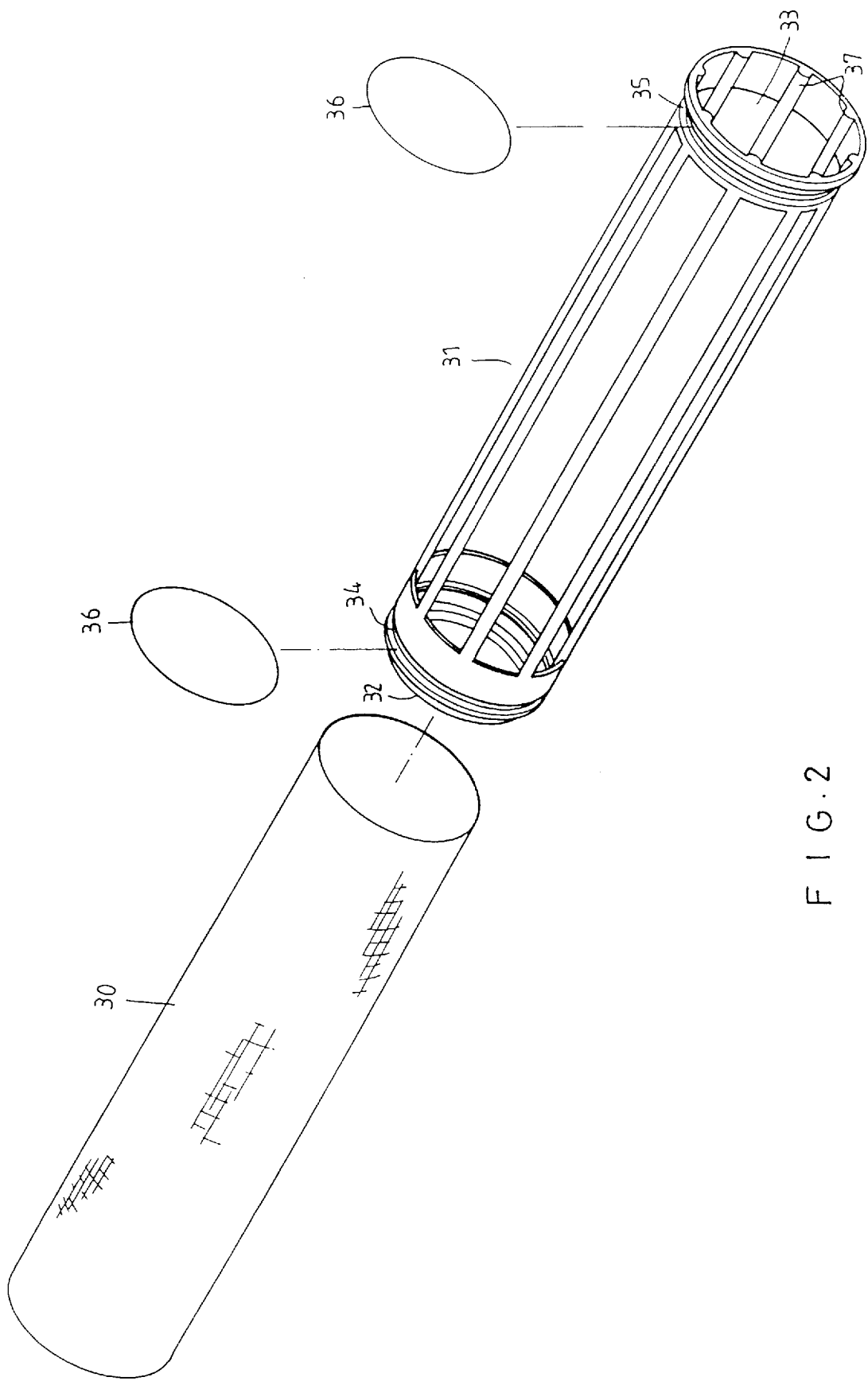
FIG. 2 is a perspective exploded view of a diaphragm and a hollow pipe.
Figure 3:
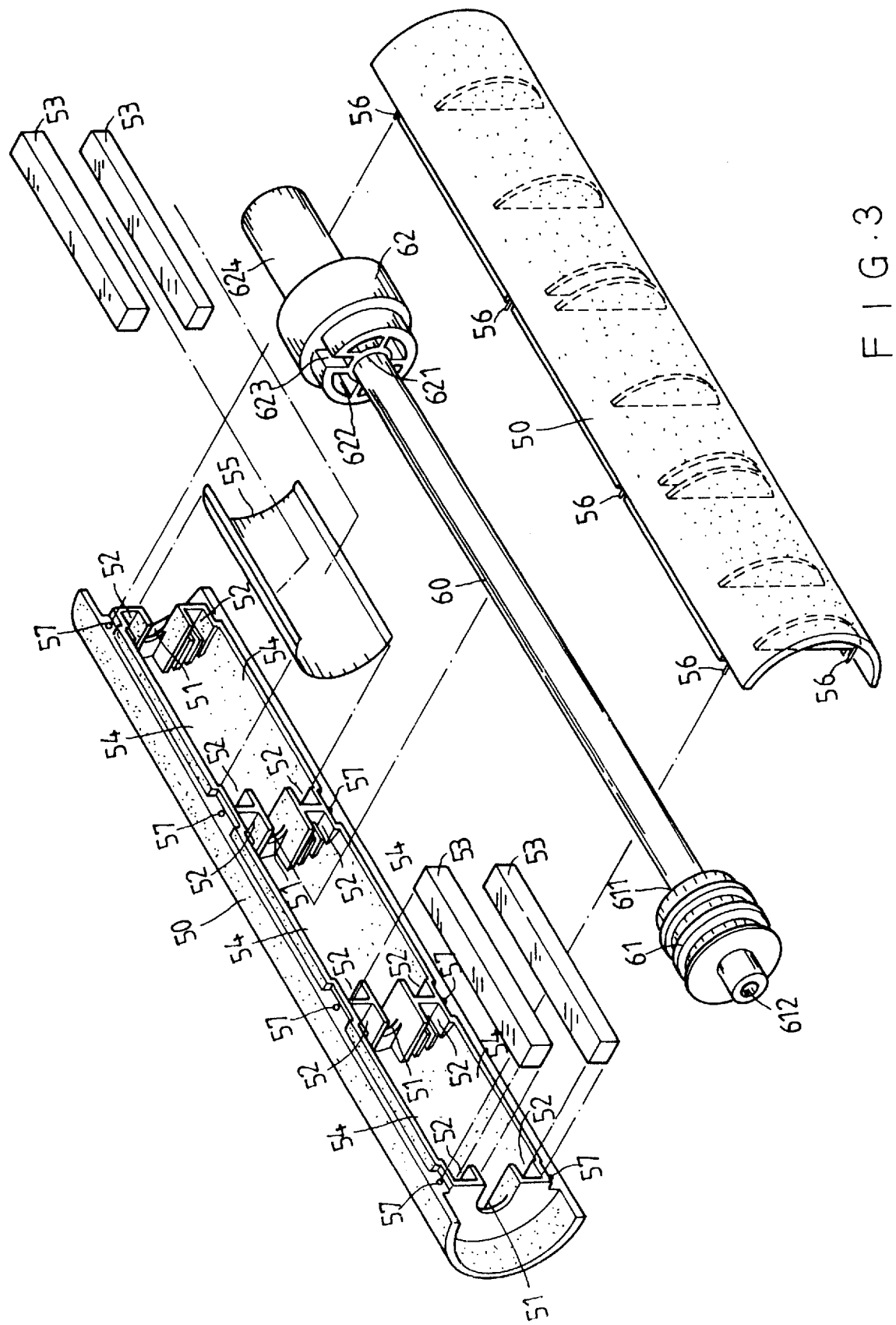
FIG. 3 is a perspective exploded view of an insulating tube and an axle.
Figure 4:
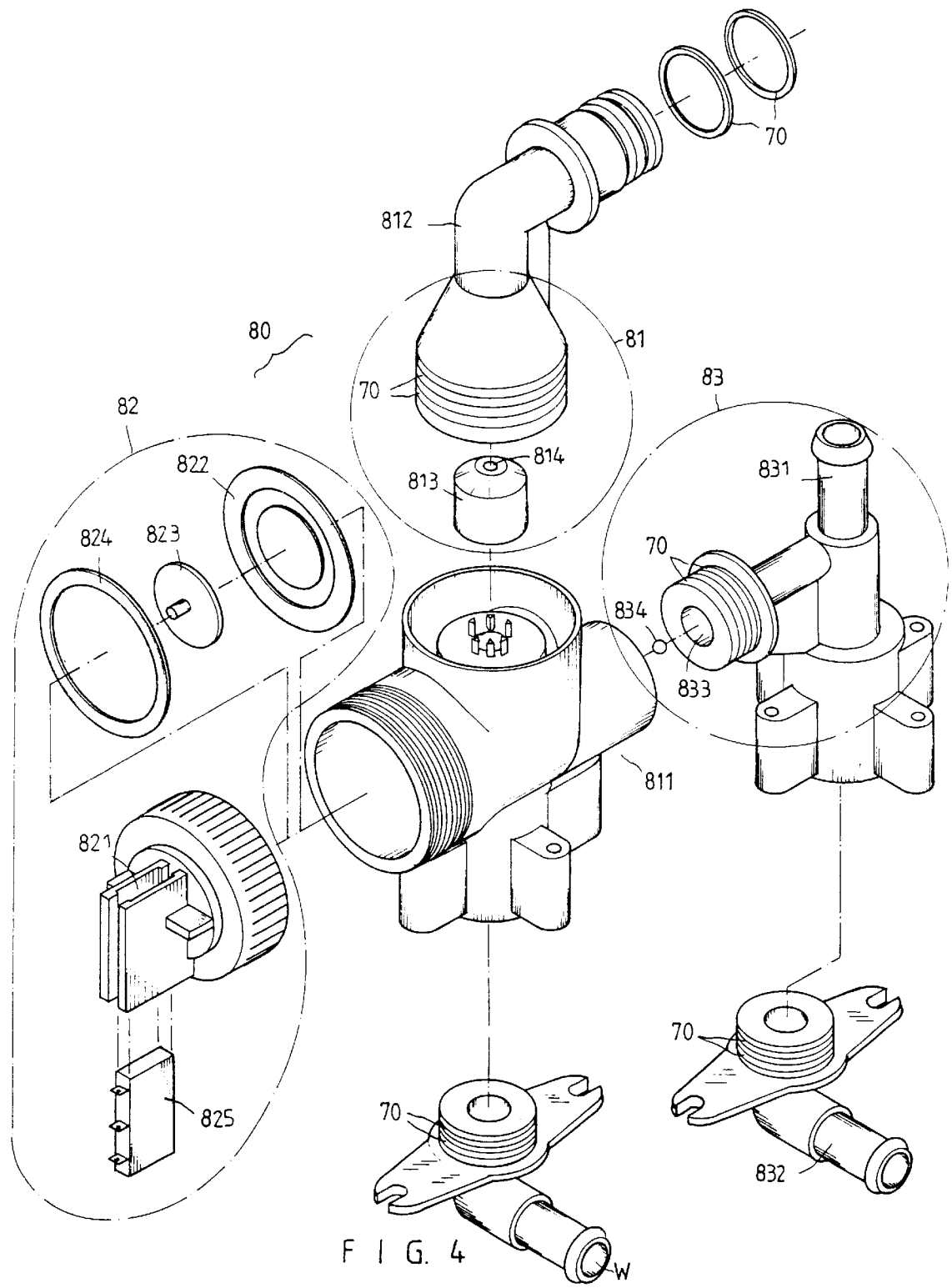
FIG. 4 is a perspective exploded view of a water flow controller.
Figure 5:
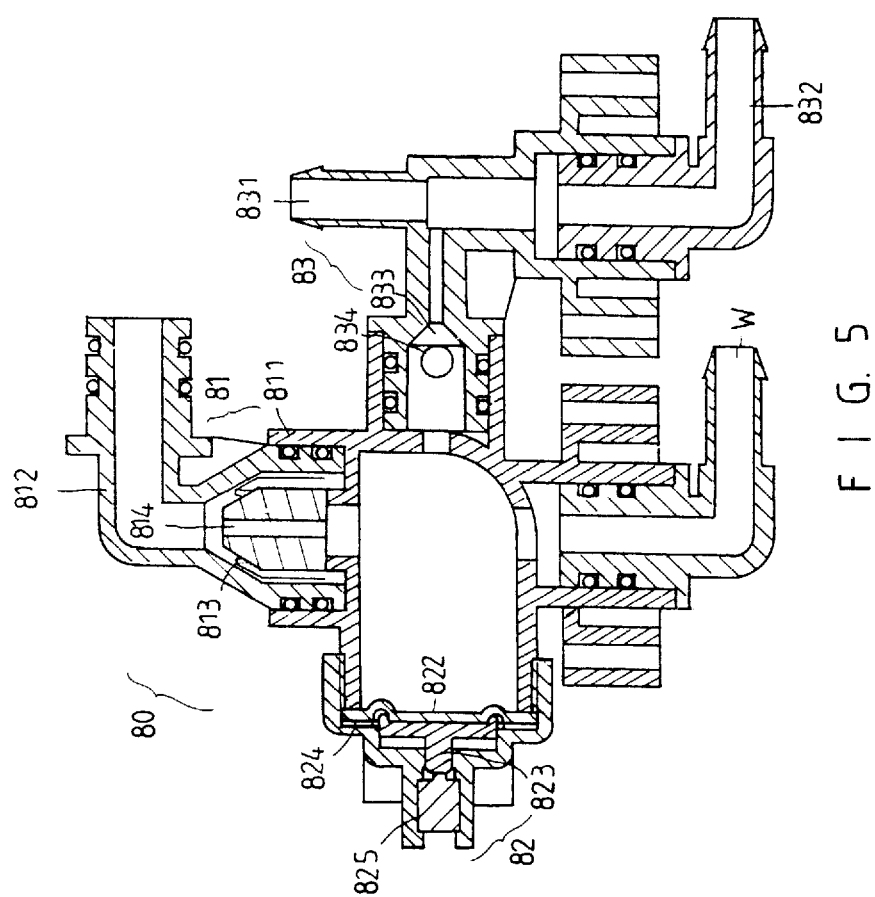
FIG. 5 is a sectional view of a water flow controller.
Figure 6A:
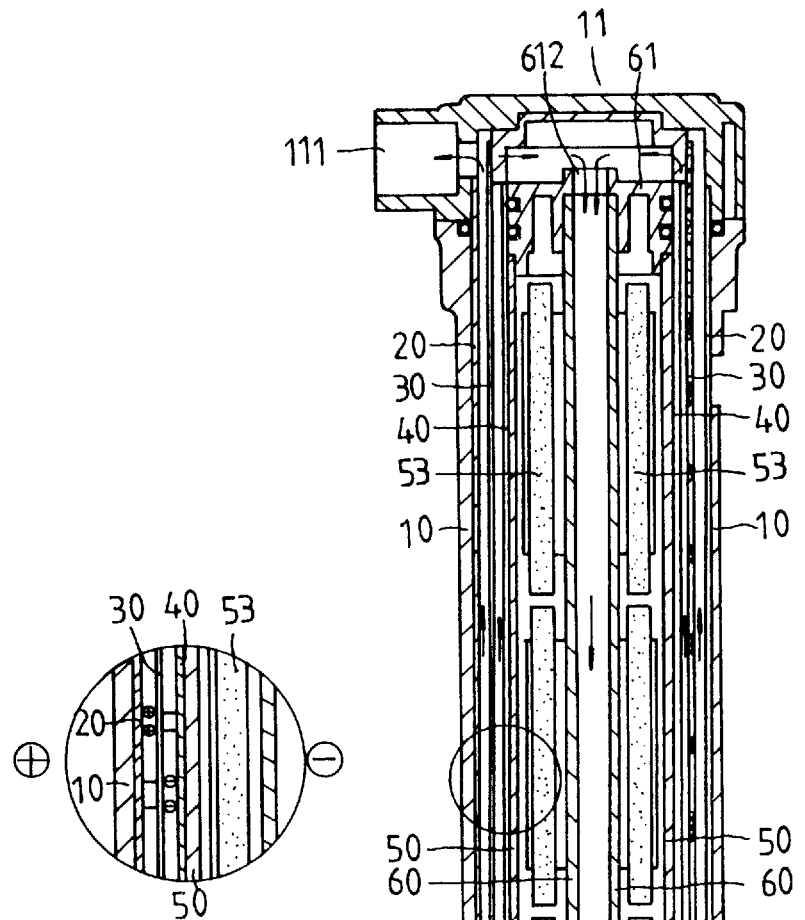
FIG. 6A is a schematic view illustrating an electrolysis of ions.
Figure 6:
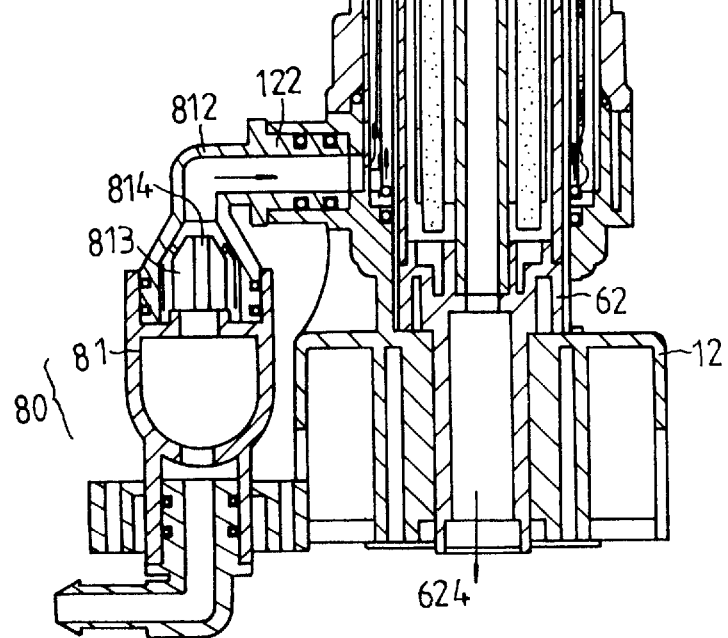
FIG. 6 is a sectional view of an electrolytic magnetization device.

Referring to FIGS. 1 to 6A, an electrolytic magnetization device comprises an outer pipe 10, an anode tube 20, a diaphragm 30, a cathode tube 40, an insulating tube 50, and a water flow controller 80. A cover 11 and a base seat 12 cover an upper end and a lower end of the outer pipe 10 respectively. The cover 11 has a water outlet 111. The outer pipe 10 has a plurality of threaded holes n to receive a plurality of corresponding screws p respectively to fasten the cover 11 and the outer pipe 10 together. The base seat 12 has a through hole 121 and a water inlet 122. The anode tube 20 is disposed in the outer pipe 10. The diaphragm 30 is disposed in the anode tube 20. A hollow pipe 31 is disposed in the diaphragm 30. The insulating tube 50 is disposed in the hollow pipe 31. The water flow controller 80 has an inlet joint 812 connected to the water inlet 122, a main body 811 disposed beneath the inlet joint 812, a flow control post 813 having a water passage 814 disposed in the inlet joint 812, a water pressure stabilizer 81 connected to the main body 811, an automatic switch device 82 connected to the main body 811, a water drain device 83 connected to the main body 811, a first outlet joint 832 connected to the water drain device 83, and a second outlet joint 832 connected to the main body 811.

The water drain device 83 has a water outlet 831, a hollow interior 833 to receive a ball 834 and a plurality of O-rings 70 disposed on the water drain device 83. The automatic switch device 82 has a switch seat 821. A washer 824, a metal disk 823 and a cushion 822 are disposed in the switch seat 821. A micromotion switch 825 is disposed on the switch seat 821.

An O-ring 70 encloses the anode tube 20. An end disk 32 and a distal groove 34 are disposed on one end of the hollow pipe 31. An opening 33 and a distal recess 35 are formed on another end of the hollow pipe 31. A first string 36 is inserted in the distal groove 34. A second string 36 is inserted in the distal recess 35. The hollow pipe 31 has a plurality of ribs 37. The insulating tube 50 has a plurality of rabbets 52, axle holes 51, positioning holes 57 and recesses 54. An axle 60 is inserted through the corresponding axle holes 51. Each recess 54 receives a yoke shaped metal plate 51. Each yoke shaped metal plate 51 receives two magnets 53. The axle 60 has a center hole 612. A plug 61 which has a first hole 611 is disposed at one end of the axle 60. An end cover 62 is disposed at another end of the axle 60. The end cover 62 has a hollow post 624, a second hole 621, a plurality of cage recesses 622, and a groove 623. A plurality of O-rings 70 enclose the plug 61. The hollow post 624 is inserted in the through hole 121.

The micromotion switch 825 contacts the metal disk 823 slightly. When the water pressure increases significantly, the micromotion switch 825 actuates a power source. When the water pressure decreases significantly, the micromotion switch 825 turns off the power source.

The present invention is not limited to the above embodiment. Any modification of the present invention may be made and understood by those skilled in the art. Furthermore, various changes in form and detail may be made without departing from the scope of the present invention.

I claim:

1. An electrolytic magnetization device comprises:

an outer pipe, an anode tube, a diaphragm, a cathode tube, an insulating tube, and a water flow controller, a cover and a base seat covering an upper end of the outer pipe and a lower end of the outer pipe respectively, the cover having a water outlet, the base seat having a through hole and a water inlet, the anode tube disposed in the outer pipe, the diaphragm disposed in the anode tube, a hollow pipe 31 disposed in the diaphragm, the insulating tube disposed in the hollow pipe, the outer pipe having a plurality of threaded holes to receive a plurality of corresponding screws respectively to fasten the cover and the outer pipe together, the water flow controller having an inlet joint connected to the water inlet, a main body disposed beneath the inlet joint, a flow control post having a water passage disposed in the inlet joint, a water pressure stabilizer connected to the main body, an automatic switch device connected to the main body, a water drain device connected to the main body, a first outlet joint connected to the water drain device, and a second outlet joint connected to the main body, the water drain device having a water outlet, a hollow interior to receive a ball and a plurality of O-rings disposed on the water drain device, the automatic switch device having a switch seat, a washer, a metal disk and a cushion disposed in the switch seat, a micromotion switch disposed on the switch seat, and the micromotion switch contacting the metal disk slightly, an O-ring enclosing the anode tube, an end disk and a distal groove disposed on one end of the hollow pipe, an opening and a distal recess formed on another end of the hollow pipe, a first string inserted in the distal groove, a second string inserted in the distal recess, the hollow pipe having a plurality of ribs, the insulating tube having a plurality of rabbets, axle holes, positioning holes and recesses, an axle inserted through the corresponding axle holes, each of the recesses receiving a yoke shaped metal plate, each yoke shaped metal plate receiving two magnets, the axle having a center hole, a plug having a first hole 611 and disposed at one end of the axle, an end cover disposed at another end of the axle, the end cover having a hollow post, a second hole, a plurality of cage recesses, and a groove, a plurality of O-rings enclosing the plug, and the hollow post inserted in the through hole.

* * * * *